United States Patent
Schoen et al.

(10) Patent No.: US 9,524,276 B2
(45) Date of Patent: Dec. 20, 2016

(54) BOOKMARKING SOCIAL NETWORKING SYSTEM CONTENT

(71) Applicant: Facebook, Inc., Menlo Park, CA (US)

(72) Inventors: Kent Schoen, San Francisco, CA (US); Carl Philip Sjogreen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 4 days.

(21) Appl. No.: 14/331,187

(22) Filed: Jul. 14, 2014

(65) Prior Publication Data

US 2014/0324587 A1     Oct. 30, 2014

Related U.S. Application Data

(63) Continuation of application No. 13/316,374, filed on Dec. 9, 2011, now Pat. No. 8,825,763.

(51) Int. Cl.
| | | |
|---|---|---|
| *G06F 15/16* | (2006.01) | |
| *G06F 17/22* | (2006.01) | |
| *G06Q 50/00* | (2012.01) | |
| *G06Q 30/02* | (2012.01) | |

(52) U.S. Cl.
CPC ....... *G06F 17/2235* (2013.01); *G06Q 30/0257* (2013.01); *G06Q 30/0277* (2013.01); *G06Q 50/01* (2013.01)

(58) Field of Classification Search
USPC ............ 709/200, 204, 219; 705/14; 707/102
See application file for complete search history.

(56) References Cited

U.S. PATENT DOCUMENTS

| | | | | |
|---|---|---|---|---|
| 7,668,821 B1* | 2/2010 | Donsbach | ......... | G06F 17/30867 707/765 |
| 8,627,388 B2* | 1/2014 | Wood | ............... | H04N 21/25808 709/231 |
| 8,977,721 B2* | 3/2015 | Goodwin | ............... | H04N 21/25 709/219 |
| 9,286,407 B2* | 3/2016 | Curwen | ............ | G06F 17/30884 |

(Continued)

FOREIGN PATENT DOCUMENTS

KR     2002/0087786 A     11/2002

OTHER PUBLICATIONS

PCT International Search Report and Written Opinion, PCT Application No. PCT/US2012/064888, Jan. 22, 2013, seven pages.

*Primary Examiner* — Anthony Mejia
(74) *Attorney, Agent, or Firm* — Fenwick & West LLP

(57) ABSTRACT

A social networking system allows users to bookmark content within the social networking system to view at a later time and/or to share with other users. The content that may be bookmarked may include advertisements, user posted content, user comments on posted content, or any other content viewable within the social networking system, as well as links to content outside of the social networking system. A user may save the content by selecting a bookmark link corresponding to the content. The bookmarked content may be viewed later, such as in a bookmarked content dashboard, and it may also be used to provide additional content to the user that is related to the bookmarked content. Additionally, the user's bookmarking activity may be published to the user's connections in the social networking system to enable others to find and view the content that the user deems worthy of bookmarking.

15 Claims, 2 Drawing Sheets

(56) References Cited

U.S. PATENT DOCUMENTS

| | | | |
|---|---|---|---|
| 2004/0254857 A1* | 12/2004 | Onizuka | G06Q 30/02 705/26.1 |
| 2005/0216346 A1* | 9/2005 | Kusumoto | G06Q 30/02 705/14.12 |
| 2006/0200443 A1* | 9/2006 | Kahn | G06F 17/3089 |
| 2006/0282328 A1 | 12/2006 | Gerace et al. | |
| 2007/0067217 A1 | 3/2007 | Schachter et al. | |
| 2007/0067331 A1* | 3/2007 | Schachter | G06Q 30/02 |
| 2007/0124208 A1* | 5/2007 | Schachter | G06F 17/30011 705/310 |
| 2007/0173266 A1* | 7/2007 | Barnes, Jr. | G06Q 10/1053 455/456.1 |
| 2008/0126318 A1 | 5/2008 | Frankovitz | |
| 2008/0162275 A1* | 7/2008 | Logan | G06F 17/30864 705/12 |
| 2008/0201225 A1* | 8/2008 | Maharajh | G06F 17/30035 705/14.43 |
| 2008/0294624 A1* | 11/2008 | Kanigsberg | G06F 17/30867 |
| 2009/0006442 A1* | 1/2009 | Anderson | G06F 17/30884 |
| 2009/0030774 A1* | 1/2009 | Rothschild | G06Q 30/02 705/14.1 |
| 2009/0119167 A1* | 5/2009 | Kendall | G06Q 30/02 705/14.17 |
| 2009/0157714 A1* | 6/2009 | Stanton | G06F 17/30699 |
| 2009/0177695 A1* | 7/2009 | Mahajan | G06Q 10/10 |
| 2009/0182713 A1* | 7/2009 | O'Sullivan | G06F 17/30884 |
| 2009/0241017 A1* | 9/2009 | Brooks | G06F 17/30884 715/206 |
| 2009/0254823 A1* | 10/2009 | Barrett | H04N 21/235 715/716 |
| 2009/0292608 A1* | 11/2009 | Polachek | G06Q 30/02 705/14.44 |
| 2010/0228582 A1* | 9/2010 | King | G06Q 30/02 705/14.66 |
| 2010/0241963 A1* | 9/2010 | Kulis | G06F 3/167 715/727 |
| 2010/0257023 A1* | 10/2010 | Kendall | G06Q 30/02 705/14.46 |
| 2010/0268717 A1* | 10/2010 | Pilskalns | G06Q 30/02 707/754 |
| 2011/0040586 A1* | 2/2011 | Murray | G06Q 30/02 705/14.49 |
| 2011/0041168 A1* | 2/2011 | Murray | G06Q 30/02 726/7 |
| 2011/0071897 A1* | 3/2011 | Kniaz | G06Q 30/00 705/14.42 |
| 2011/0106615 A1* | 5/2011 | Churchill | G06Q 30/02 705/14.49 |
| 2011/0112916 A1* | 5/2011 | Baluja | G06Q 30/02 705/14.73 |
| 2011/0153413 A1* | 6/2011 | Chunilal | G06F 17/30867 705/14.42 |
| 2011/0170837 A1* | 7/2011 | Barnes, Jr. | G06Q 10/02 386/239 |
| 2011/0191417 A1 | 8/2011 | Rathod | |
| 2011/0231240 A1* | 9/2011 | Schoen | G06Q 30/0242 705/14.41 |
| 2011/0258042 A1* | 10/2011 | Purvy | G06Q 30/02 705/14.49 |
| 2011/0289135 A1* | 11/2011 | Soldan | G06Q 30/0277 709/203 |
| 2011/0289142 A1* | 11/2011 | Whalin | G06Q 30/02 709/203 |
| 2011/0302029 A1* | 12/2011 | Harmon | G06Q 30/0251 705/14.49 |
| 2012/0005209 A1* | 1/2012 | Rinearson | G06F 17/30908 707/737 |
| 2012/0047529 A1* | 2/2012 | Schultz | H04N 21/252 725/34 |
| 2012/0054589 A1* | 3/2012 | Berger | G06Q 50/01 715/202 |
| 2012/0084160 A1* | 4/2012 | Badros | G06Q 30/0241 705/14.73 |
| 2012/0089911 A1* | 4/2012 | Hosking | G06F 17/30743 715/716 |
| 2012/0150661 A1* | 6/2012 | DeStein | G06Q 30/0276 705/14.72 |
| 2012/0158501 A1* | 6/2012 | Zhang | G06Q 30/0255 705/14.53 |
| 2012/0166274 A1* | 6/2012 | Krishnamoorthy | G06Q 30/0251 705/14.49 |
| 2012/0233009 A1* | 9/2012 | Fougner | G06Q 50/01 705/26.3 |
| 2012/0250540 A1* | 10/2012 | Smartt | H04L 12/189 370/252 |
| 2012/0265608 A1* | 10/2012 | Bhatia | G06Q 30/0207 705/14.45 |
| 2012/0278387 A1* | 11/2012 | Garcia | G06Q 50/01 709/204 |
| 2012/0330749 A1* | 12/2012 | Janes | G06Q 30/0277 705/14.53 |
| 2013/0030905 A1* | 1/2013 | Fuloria | G06Q 50/01 705/14.39 |
| 2013/0044959 A1* | 2/2013 | Mitchell | G06Q 30/02 382/217 |
| 2013/0060644 A1* | 3/2013 | Le Ouay | G06Q 30/0241 705/14.69 |
| 2013/0073632 A1* | 3/2013 | Fedorov | G06Q 10/101 709/205 |
| 2013/0104030 A1* | 4/2013 | Parreira | G06F 17/2247 715/234 |
| 2013/0124625 A1* | 5/2013 | Cathcart | G06F 17/30861 709/204 |
| 2013/0151339 A1* | 6/2013 | Kim | G06F 17/3082 705/14.55 |
| 2013/0151610 A1* | 6/2013 | Schoen | G06Q 50/01 709/204 |
| 2015/0052201 A1* | 2/2015 | Brooks | H04L 67/22 709/204 |

* cited by examiner

BOOKMARKING SOCIAL NETWORKING SYSTEM CONTENT

CROSS REFERENCE TO RELATED APPLICATIONS

This application is a continuation of U.S. application Ser. No. 13/316,374, filed Dec. 9, 2011, which is incorporated by reference in its entirety.

BACKGROUND

This invention relates generally to software tools for saving social networking data, and more particularly to bookmarking advertisements and other content items that are displayed to a user of the social networking system.

A social networking system receives content from its users and displays that content to other users via various channels. In the newsfeed channel, for example, a feed of stories for a particular user is periodically updated with new content as it is provided to the social networking system. Newsfeed content therefore has a high decay rate as content displayed in a newsfeed story is updated frequently. For example, content shared by a user may appear in a newsfeed the day it is shared, but may not appear in a newsfeed within a few hours or a few days. Therefore, users who would like to access a particular story in the newsfeed at a later time may not be able to find that newsfeed story.

The same problem exists for advertisements displayed in the social networking system. In the social networking system environment, advertisements may include a social context, where the advertisement communicates an action of one of the user's connections taken in connections with a thing being advertised. For these types of advertisements, users may be even more interested in interacting with the advertisement. However, advertisements are often selected for a user and displayed each time the user refreshes a page. Accordingly, if a user notices an interesting advertisement, the user must immediately interact with the advertisement or risk never seeing that advertisement again. This may be undesirable, since this requires the user to switch attention to the advertisement instead o what the user is currently viewing on the social networking system.

Social networking system users can similarly navigate to other users' profile page to view content shared by others. Since such content is always available on users' profile page, it generally does not have a high decay rate, but it may be similarly difficult for users to revisit the shared content at a later time. For example, users may not remember the name of the sharing user or may not remember to navigate to another user's profile page at a later time. If the shared content is a link to a webpage or a system outside the social networking system, a user may be able revisit the shared content by navigating to the webpage and bookmarking it using a browser's toolbar. Such a method of bookmarking items is disadvantageous because the social networking system may not be able to track a user's actions or interests once the user navigates out of the social networking system.

Accordingly, systems are needed to enable social networking system users to save content, including advertisements, to view and interact with later in the social networking system environment.

SUMMARY

Embodiments of the invention enable users to bookmark content displayed by a social networking system. The social networking system bookmarks allow users to view the bookmarked content at a later time by logging into the social networking system. Additionally, the social networking system may provide additional content to the user based on his or her social bookmarks. The social networking system may also communicate the users' bookmarking activity to other users of the social networking system, thereby creating an environment in which the content can be spread virally.

In one embodiment, the social networking system displays content to users. Content may include status updates, uploaded images, videos, links to webpage addresses outside of the social networking system domain, advertisements, game applications, etc. In one embodiment, the social networking system provides user interface elements to allow a user to bookmark the content within the social networking system to enable the user to view the content at a later time. If a user selects the user interface elements indicating a request to bookmark a content item, the social networking system associates the content item with the user's profile. In one embodiment, the bookmarked content is displayed in a news feed and displayed to other users of the social networking system. The newsfeed may include the bookmarked content and a text or an image indicating that the user bookmarked the content.

In another embodiment, the bookmarked content may be displayed to the user in a bookmarking dashboard. The bookmarking dashboard includes the bookmarked content and may include additional content identified by the social networking system. The additional content may be similar to the bookmarked content and may include, for example advertisements. In one embodiment, the advertisements are selected if they advertise items similar to the bookmarked content items based on a notion that users are likely to bookmark content that they are interested in and therefore they are likely to be interested in advertisements similar to the bookmarked content. In other embodiments, the advertisements are selected if the user meets the advertisement's targeting criteria. Targeting criteria may include characteristics of a user who should be targeted to display the advertisement. Examples of targeting criteria include, but are not limited to the user's demographic information, social networking usage information, bookmarking activity and interests as indicated on the social networking system.

In an embodiment wherein the user bookmarks an advertisement within the social networking system, the advertisement may be retargeted or re-displayed to the user. In one embodiment, an retargeted advertisement may be displayed to the user on other instances when the user visits the social networking system. In other embodiments, the retargeted advertisement is displayed to the user on a third-party webpage or system outside of the social networking system.

The features and advantages described in this summary and the following detailed description are not all-inclusive. Many additional features and advantages will be apparent to one of ordinary skill in the art in view of the drawings, specification, and claims thereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system provides content to its users. Content may include but is not limited to advertisements, social applications, status messages, private messages, photos and videos. Content may also be displayed to the user in a variety of formats. For example, content such as advertisements may be displayed to the user as a banner ad or as text and image. The advertisements may be displayed on a webpage used to view the social networking system content or on an application executing on a computing device. Similarly, content such as status messages, photos, videos, etc., may be displayed to the user within a newsfeed story.

Content, such as advertisements and newsfeed stories may be displayed to the user based on several factors. For example, an advertisement may be displayed to the user if the user meets the targeting criteria of the advertisement. Additionally, if the user has been shown one or more instances of an advertisement, the advertisement may no longer be displayed to the user. Similarly if a newsfeed story has been displayed to the user one or more times, it may no longer appear within the user's newsfeed. Embodiments of the present invention enable user to bookmark content such that the user may view the bookmarked content in the social networking system at a later time.

Figure 1:
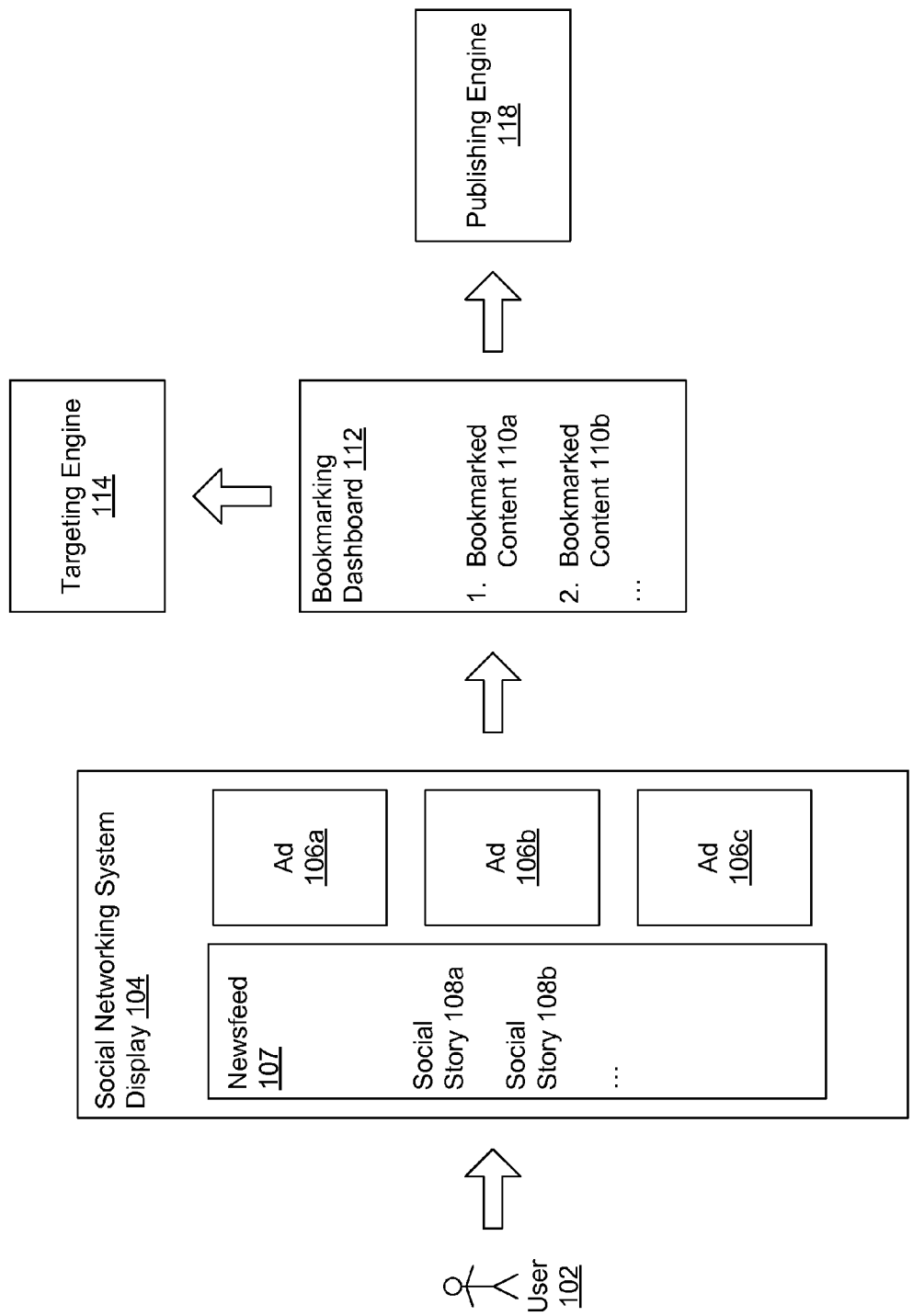
FIG. 1 is a diagram of a system for bookmarking content within a social networking system, in accordance with an embodiment of the invention.

FIG. 1 illustrates a system for bookmarking content within the social networking system, in accordance with an embodiment of the invention. In one embodiment, the user 102 views a social networking system display 104 on a computing device. The social networking system display 104 may include one or more advertisements (ads) 106*a-c* and one or more social stories 108*a-c*. In one instance, if the user bookmarks an ad 106 or a social story 108, the bookmarked content 110 may be stored with the social networking system. The bookmarked content 110 may be displayed to the user within a bookmarking dashboard 112. The bookmarking dashboard 112 may include a listing of content bookmarked by the user within the social networking system and links to access the content within the social networking system or outside the social networking system. The bookmarking dashboard may also include content selected by the targeting engine 114. In one embodiment, the bookmarking dashboard 112 may be accessed by the user by selecting a link or a button within a social networking system display.

In one embodiment, a targeting engine 114 identifies advertisements or any social networking system content to display to a user based on the content bookmarked by the user 102. For example, the targeting engine 114 may identify tags or words associated with bookmarked content 110 and may identify social networking system content or advertisements that have similar words or tags. In one instance, if the bookmarked content 110 matches advertisement criteria provided by an advertiser, the advertisement may be selected by the targeting engine 114 to display to the user.

A publishing engine 118 displays the bookmarked content 110 to other users of the social networking system. In one instance, the publishing engine 118 displays the bookmarked content in a newsfeed story by including a link to the bookmarked content and including a display indicating that the user 102 bookmarked the content with the social networking system. As such, other users of the social networking system may view or access the bookmarked content 110. Thus, the social networking system may take advantage of network effects to promote and display bookmarked content to users of the social networking system.

The user 102 of the social networking system may be an entity that has registered with the social networking system. The user 102 may include, for example, a person, a business, an association, an institution or a group. The user 102 may log on to the social networking system to interact with the social networking system and other users of the social networking system. The user may interact with the social networking system by using one or more functionalities provided by the social networking system, such as sending and receiving messages, posting comments, uploading photos and videos, etc.

In one embodiment, when the user 102 logs on to the social networking system, the user is provided with a social networking system display 104. The social networking system display 104 may be displayed within the webpage or an application executing on a computing device. The social networking system display 104 may include ads 106 and social stories 108. In one embodiment, ads 106 may include advertisements displayed to the user within the social networking system display 104. Ads 106 may comprise of banner ads, images or text. Social stories 108 may include information about status updates, photo updates, location updates and any other social networking system actions that may be taken by one or more users of the social networking system. In one embodiment, the social stories 108 are displayed within a newsfeed to the user. A newsfeed includes one or more social stories 108 from one or more users of the social networking system. In other embodiments, ads 106 may be displayed to the user as part of the social story 106 within a newsfeed.

In one embodiment, the ads 106 and social stories 108 include a user interface element enabled to bookmark associated content. The user interface element may include but is not limited to an image, text or a button. If the user selects the user interface element the ad 106 or the social story 108 is bookmarked 110 by the social networking system.

System Architecture

Figure 2:
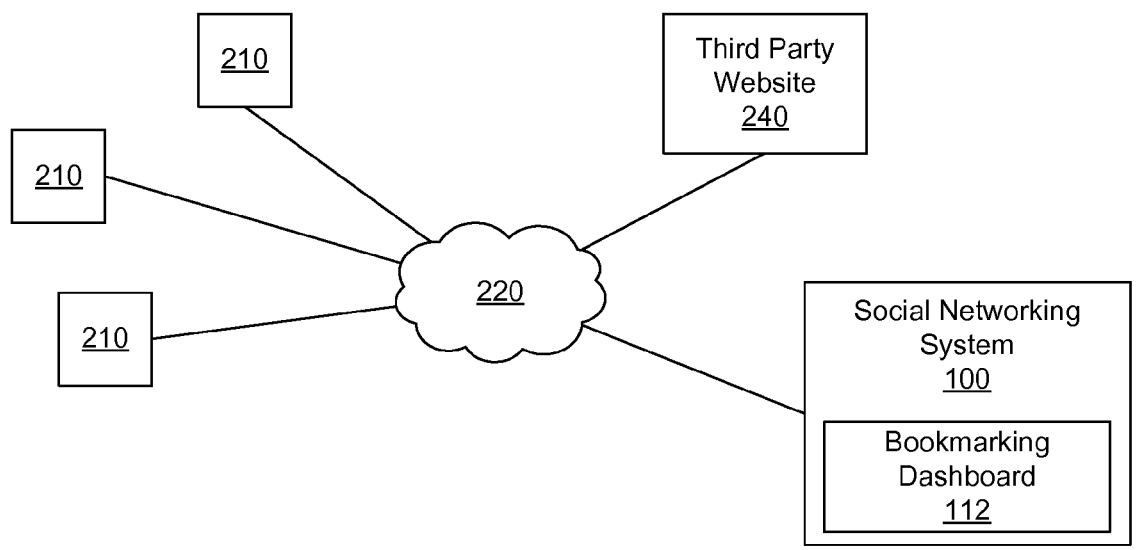
FIG. 2 is a network diagram including a social networking system for bookmarking content.

FIG. 2 is a high level block diagram illustrating a system environment suitable for operation of a social networking system 100. The system environment comprises one or more client devices 210, one or more users 102 associated with each one or more client devices 210, one or more third-party website 240, a social networking system 100 comprising a bookmarking dashboard 108 and a network 220. In alternative configurations, different and/or additional modules can be included in the system.

The client devices 210 comprise one or more computing devices that can receive user input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 220 are configured to communicate via network 220, which may comprise any combination of local area and/or wide area networks, using both wired and wireless communication systems. The third party content provider 240 may be coupled to the network 220 for communicating messages to the social networking system 100 about the users' actions off the system 100.

Figure 3:
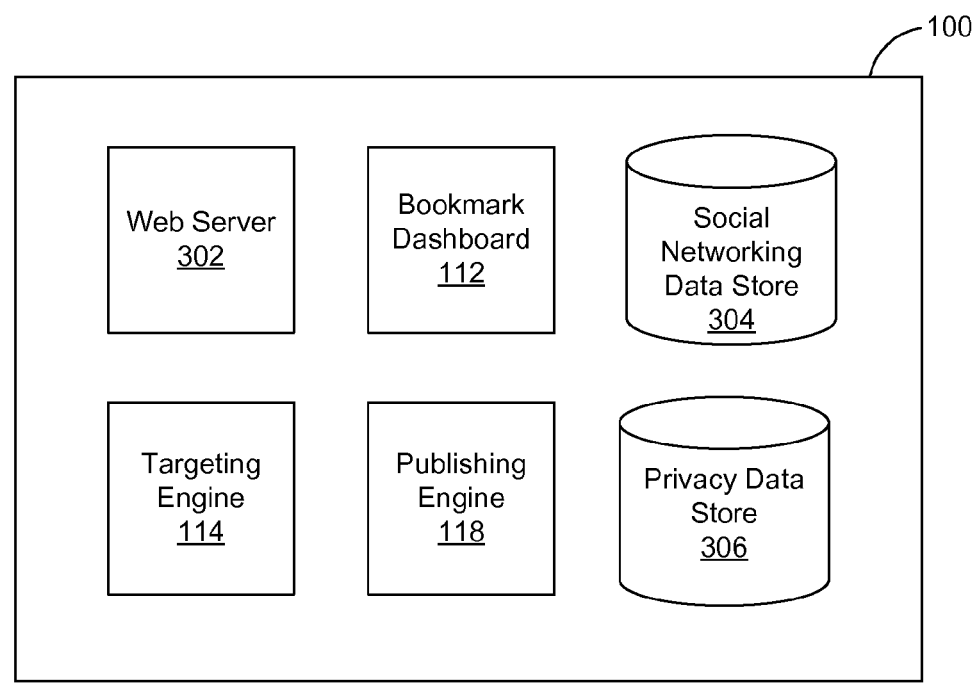
FIG. 3 is a block diagram of a social networking system in accordance with an embodiment of the invention.

FIG. 3 is a block diagram of a social networking system for bookmarking content displayed by a social networking system 100. The social networking system 100 includes a web server 302, a social networking data store 304, a privacy data store 306, a bookmarking dashboard 112, a targeting engine 114 and a publishing engine 118. In other embodiments, the social networking system 100 may include additional, fewer, or different modules for various applications.

The web server 302 links the social networking system 100 via the network 220 to one or more client devices 210, as well as to one or more third party website 140. The web server 302 may include a mail server or other messaging functionality for receiving and routing messages between the social networking system 100 and the client devices 210 or third party websites 140. The messages can be instant messages, queued messages (e.g., email), text and SMS messages, or any other suitable messaging technique. Additionally, the web server 302 links the social networking system 100 to client devices 210 wherein the client devices can be used to log into the social networking system by using an application executing on the mobile device 210 or by using a web browser executing on the mobile device 210.

The social networking data store 302 includes social networking system information that is tracked and maintained by a social networking system. In one embodiment, the social networking system data is stored as a social graph within the social networking system data store 302. The social graph includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects.

In one embodiment the bookmarking dashboard 112 associates bookmarked content 110 to the user's social graph. In one instance, a user, a social story 108, an ad 106 or any content that may be bookmarked by a user 102 represents nodes in a social networking system social graph. In such an instance, the bookmarking dashboard 112 may add an edge between a user and bookmarked content to connect them within the social networking system 100. In other instances, the bookmarking dashboard 112 saves the bookmarked content in a user's profile within the social networking system.

The targeting engine 114 identifies content that may be displayed to the user as a result of the user bookmarking content within the social networking system. In one instance, the targeting engine 114 identifies tags or words associated with the content bookmarked by the user. Tags often provide context for content displayed by a social networking system or third party website. For example, a video about tennis may have tags including, sports, serve, deuce, etc. Users may identify whether a video meets theirs viewing preferences without viewing the video. Similarly, news articles, images, social networking system content may include tags. In one embodiment, the targeting engine 114 identifies other content within the social networking system with tags similar to the bookmarked content 110 and selects the content to display to the user. In other embodiments, the targeting engine may find content that is complementary or related to bookmarked content to display to a user.

In one embodiment, the targeting engine 114 identifies advertisements to display to a user based on content bookmarked by the user. An advertisement may include targeting criteria outlining requirements a user should meet to display the advertisement to the user. Targeting criteria may include information that may be captured in a user bookmarking content within the social networking system. For example, targeting criteria may include that a user should be interested in athletic exercises, should have read an article on running, etc. Similarly, the targeting engine may identify that a user is interested in athletic exercise if the user bookmarks content with a 'running' or 'jogging' tag. In such an instance, the targeting engine 114 identifies a user as meeting the advertisement's targeting criteria and selects the advertisement to display to the user. The selected advertisement may be displayed to the user within a social networking system display.

In an embodiment wherein the user bookmarks an advertisement within the social networking system, the targeting engine 114 retargets the advertisement to the user. For example, a user may bookmark an advertisement with the intention of viewing it later, however the user may forget to view the advertisement at a later point in time. In such an instance, the bookmarking engine 114 displays the bookmarked advertisement to the user. In one embodiment, the retargeted advisement is provided to the user within the social networking system. In another embodiment, the bookmarked advertisement is provided to the user on a third-party webpage or a system outside of the social networking system.

The publishing engine 118 publishes the bookmarked content to users of the social networking system. In one instance, the publishing engine 118 publishes that a user bookmarked a content and includes a link to that content. For example, if a user bookmarked a post about running shoes posted by another user of the social networking system, the publishing engine 118 may publish that the user bookmarked the post and a link to view the post. The information about the user bookmarking a post may be provided to other users of the social networking system if the other users meet the bookmarking user's privacy settings.

Social networking system users' privacy settings are stored in a privacy data store 306. In one embodiment, users may specify user content that may be shared with other users of the social networking system. For example, a user can provide that content generated by a user may only be displayed to friends of the user within the social networking system. Similarly, the user may specify that the user's bookmarking activity may be displayed to friends of the user or specific group of user's friends within the social networking system. In such an instance, the publishing engine 118 access the privacy data store 306 and identifies other users of the social networking system who may view the user's bookmarking activity. The publishing engine 118 displays the bookmarked content and the user's bookmarking activity to the users who meet the bookmarking user's privacy settings. In one embodiment, the publishing engine 118 publishes the bookmarked content and the bookmarking activity within others' news feed. In other instances, the bookmarking activity and content may be published on the bookmarking user's social networking system profile.

Method for Bookmarking Content

In one embodiment, the social networking system receives a request to bookmark content from a user. The request may be provided by a user based on the user interface used to display content to the user. As described herein, content includes user generated social networking data, such as profile posts, wall posts, photo/video comments etc., and content linked by a user, including photos/videos, articles, webpages etc. A user may request to bookmark content by interacting with a user interface provided by the social networking system. In one instance, each content story may include a button requesting a user to bookmark content.

Responsive to receiving a request to bookmark content, the social networking system stores the bookmarking activity within the social networking system. Bookmarking activity includes information indicating that a user requested to bookmark content and the time and date of the bookmark request. In one embodiment, the bookmarking activity is stored as an edge connecting a user node and a content node within the social networking system social graph.

In one embodiment, the social networking system identifies additional content that may be displayed to the bookmarking user as a result of his or her bookmarking activity. The additional content may include other social networking system content or advertisements. The additional content may be identified based on the subject of the bookmarked content and the subject of the additional content. For example, if the additional content's subject is the same, similar or related to the bookmarked content, the additional content is selected to display to the user.

In one embodiment, if the bookmarking activity meets an advertisement's targeting criteria, the advertisement is identified as additional content to display to a user. For example, the act of bookmarking a content item may indicate that the user is interested in the content of the bookmarked content. For example, if a user bookmarks an advertisement for NIKE running shoes, it could indicate that the user is interested in purchasing running shoes or the user is interested in participating in running activities. In such an instance, the process identifies additional content to display to the user, including but not limited to advertisements for running shoes by other manufacturers or merchants, advertisements complementary products, such as marathons, socks or other running materials. The likelihood or the click-through-rate of a user being interested in items or the click-through-rate of an item advertising similar or complementary products to the bookmarked items is likely to be higher than randomly displayed advertisement to the user. Therefore, based on the higher click-through-rate and the higher overall expected value of serving the additional advertisement to the user, the social networking system may charge a higher rate to advertisers for displaying such additional advertisements to the user.

Additionally, the bookmarking activity may be published to other users within the social networking system. In one embodiment, the bookmarking activity is published to other users if they meet the bookmarking user's privacy criteria. For example, if the bookmarking user provides that his or her bookmarking activity can be seen by the user's friend, the bookmarking activity may be published to all of the user's friends. Similarly, if the user provides that the bookmarking activity may be viewed by anyone, the bookmarking activity may be published to any user of the social networking system.

SUMMARY

The foregoing description of the embodiments of the invention has been presented the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method comprising:
   sending a content item for display to a user of a social networking system, the content item including a user interface element for requesting a bookmark of the content item;
   receiving, from the user, a selection of the user interface element for requesting a bookmark of the content item;
   identifying the bookmarked content item stored in connection with the user;

selecting the bookmarked content item for retargeting to the user based on the existence of the bookmark that identifies the selected bookmarked content item;

selecting, by the social networking system, one or more users, wherein the selected one or more users satisfy the following criteria:
- the selected one or more users are connected to the user in the social networking system, and
- the selected one or more users satisfy privacy criteria that is specified by the user; and responsive to the selecting, sending information associated with the selected bookmarked content item for display in a feed to the selected one or more users, the information comprising a textual description indicating that the user bookmarked the content item and a link to access the content item.

2. The method of claim 1, wherein the bookmarked content item comprises a private message received by the user via the social networking system, information associated with or displayed on a webpage outside the social networking system domain, an image file received by the user via the social networking system, a video file received by the user via the social networking system, content associated with a social application, or content associated with a gaming application.

3. The method of claim 1, wherein the bookmarked content item comprises a social story including a status update, a photo update, or a location update posted by a social networking system user.

4. The method of claim 1, further comprising enabling display of the information associated with the selected bookmarked content item as a story in the user's newsfeed.

5. The method of claim 1, further comprising providing within a list of additional content items, the information associated with the selected bookmarked content item, to the selected one or more users.

6. The method of claim 1, further comprising associating with the selected bookmarked content item, a tag for providing the user a summary of contextual information regarding the selected bookmarked content item.

7. The method of claim 1, wherein the textual description indicating that the user bookmarked the content item comprises one or more of: an identity of the user, a time of receiving the selection of the user interface element for requesting the bookmark, a date of receiving the selection of the user interface element for requesting a bookmark, and a location at which the user selected the user interface element for requesting a bookmark.

8. The method of claim 1, further comprising establishing a connection in the social networking system between the user and an object in the social networking system associated with the bookmarked content item.

9. A computer-implemented method comprising:
sending an advertisement for display to a user of a social networking system, the advertisement including a user interface element for requesting a bookmark of the advertisement;
receiving, from the user, a selection of the user interface element for requesting a bookmark of the advertisement;
identifying the bookmarked advertisement stored in connection with the user;
selecting the bookmarked advertisement for retargeting to the user based on the existence of the bookmark that identifies the selected bookmarked advertisement;
selecting, by the social networking system, one or more users, wherein the selected one or more users satisfy the following criteria:
- the selected one or more users are connected to the user in the social networking system, and
- the selected one or more users satisfy privacy criteria that is specified by the user; and responsive to the selecting, sending information associated with the selected bookmarked advertisement for display in a feed to the selected one or more users, the information comprising a textual description indicating that the user bookmarked the advertisement and a link to access the content item.

10. The method of claim 9, further comprising providing to the selected one or more users, within a list of advertisements, the information associated with the selected bookmarked advertisement, the list of advertisements comprising advertisements for similar or complementary products to a product associated with the selected bookmarked advertisement.

11. The method of claim 9, wherein the textual description indicating that the user bookmarked the content item comprises one or more of: an identity of the user, a time of receiving the selection of the user interface element for requesting the bookmark, a date of receiving the selection of the user interface element for requesting a bookmark, and a location at which the user selected the user interface element for requesting a bookmark.

12. A non-transitory computer program product comprising a computer-readable storage medium containing computer program code for:
sending a content item for display to a user of a social networking system, the content item including a user interface element for requesting a bookmark of the content item;
receiving, from the user, a selection of the user interface element for requesting a bookmark of the content item;
identifying the bookmarked content item stored in connection with the user;
selecting the bookmarked content item for retargeting to the user based on the existence of the bookmark that identifies the selected bookmarked content item;
selecting, by the social networking system, one or more users, wherein the selected one or more users satisfy the following criteria:
- the selected one or more users are connected to the user in the social networking system, and
- the selected one or more users satisfy privacy criteria that is specified by the user; and responsive to the selecting, sending information associated with the selected bookmarked content item for display in a feed to the selected one or more users, the information comprising a textual description indicating that the user bookmarked the content item and a link to access the content item.

13. The non-transitory computer program product of claim 12, wherein the bookmarked content item comprises a private message received by the user via the social networking system, information associated with or displayed on a webpage outside the social networking system domain, an image file received by the user via the social networking system, a video file received by the user via the social networking system, content associated with a social application, or content associated with a gaming application.

14. The non-transitory computer program product of claim 12, wherein the textual description indicating that the user bookmarked the content item comprises one or more of:

an identity of the user, a time of receiving the selection of the user interface element for requesting the bookmark, a date of receiving the selection of the user interface element for requesting a bookmark, and a location at which the user selected the user interface element for requesting a bookmark.

15. A computer system comprising:
    a processor; and
    memory coupled to the processor, the memory having encoded thereon instructions that, when executed by the processor, cause the processor to:
    send a content item for display to a user of a social networking system, the content item including a user interface element for requesting a bookmark of the content item;
    receive, from the user, a selection of the user interface element for requesting a bookmark of the content item;
    identify the bookmarked content item stored in connection with the user;
    select the bookmarked content item for retargeting to the user based on the existence of the bookmark that identifies the selected bookmarked content item;
    selecting, by the social networking system, one or more users, wherein the selected one or more users satisfy the following criteria:
        the selected one or more users are connected to the user in the social networking system, and
        the selected one or more users satisfy privacy criteria that is specified by the user; and
    responsive to the selecting, send information associated with the selected bookmarked content item for display in a feed to the selected one or more users, the information comprising a textual description indicating that the user bookmarked the content item and a link to access the content item.

* * * * *